United States Patent
Yadav et al.

(10) Patent No.: US 10,474,539 B1
(45) Date of Patent: Nov. 12, 2019

(54) BROWSING FEDERATED BACKUPS

(71) Applicant: EMC Corporation, Hopkinton, MA (US)

(72) Inventors: Sunil Yadav, Bangalore (IN); Pradeep Anappa, Bangalore (IN); Elango Chokalingam, Bangalore (IN); Matthew D. Buchman, Seattle, WA (US); Suman Tokuri, Bangalore (IN); Vladimir Mandic, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 613 days.

(21) Appl. No.: 14/975,483

(22) Filed: Dec. 18, 2015

(51) Int. Cl.
*G06F 17/30* (2006.01)
*G06F 11/14* (2006.01)
*G06F 16/248* (2019.01)
*G06F 16/28* (2019.01)
*G06F 16/951* (2019.01)

(52) U.S. Cl.
CPC ........ *G06F 11/1464* (2013.01); *G06F 16/248* (2019.01); *G06F 16/284* (2019.01); *G06F 16/951* (2019.01); *G06F 2201/80* (2013.01)

(58) Field of Classification Search
CPC .......... G06F 11/1464; G06F 17/30554; G06F 17/30595; G06F 17/30864; G06F 16/248; G06F 16/284; G06F 16/951; G06F 2201/80
See application file for complete search history.

(56) References Cited

U.S. PATENT DOCUMENTS

| | | | | |
|---|---|---|---|---|
| 8,219,769 | B1 * | 7/2012 | Wilk | G06F 11/1464 707/640 |
| 8,244,998 | B1 * | 8/2012 | Krinke, II | G06F 11/1464 711/161 |
| 8,712,966 | B1 * | 4/2014 | Armorer | G06F 11/1464 707/645 |
| 2005/0246398 | A1 * | 11/2005 | Barzilai | G06F 11/1448 |
| 2007/0214196 | A1 * | 9/2007 | Garimella | G06F 11/1464 |

* cited by examiner

*Primary Examiner* — Shew Fen Lin
(74) *Attorney, Agent, or Firm* — Womble Bond Dickinson (US) LLP

(57) ABSTRACT

Embodiments described herein provide for a system and associated logic to enable browsing of a federated backup having a plurality of portions, each portion separately generated and indexed by a plurality of nodes. In one embodiment, the system performs a federated backup by generating a unique identifier on a primary node and providing the unique identifier to each secondary node tasked with generating the plurality of portions. The secondary nodes associate the unique identifier with each of the plurality of portions. The unique identifier can then be used by a recovery UI to generate and display a consolidated view of the plurality of portions.

18 Claims, 11 Drawing Sheets

BROWSING FEDERATED BACKUPS

TECHNICAL FIELD

This disclosure generally relates to the field of backing up data, and more particularly to browsing a set of federated backups.

BACKGROUND

A backup or the process of backing up is making copies of data that may be used to restore the original data. Should a data loss event occur, the backup may be used to recover the original data from a time before the data loss event. Examples of data loss events include data deletion or corruption (e.g., natural disasters, fire, floods, earthquake, human error, software bugs, hardware failure, or software viruses). In the information management field, applications are often configured in a federated manner. Federated applications are configured with the ability to access information and communicate between disparate, semi-autonomous, and de-centralized data stores. Backup and restore of federated deployments can be done using a federated backup and restore architecture. Federated backup architectures divide backup roles into a primary role and a secondary role. The primary is responsible for starting the secondary on each node, assigning the jobs to the secondary, and monitoring the secondary's activities. The secondary performs the actual operations, such as saving the backup data on a backup store and indexing the backup data to enable the backup to be browsed and recovered by end users. Generally, each secondary works independently to enable the backup work performed by the secondary to be independently recovered. Accordingly, if a single secondary encounters a failure, end users can browse and recover good backups performed by a different secondary.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
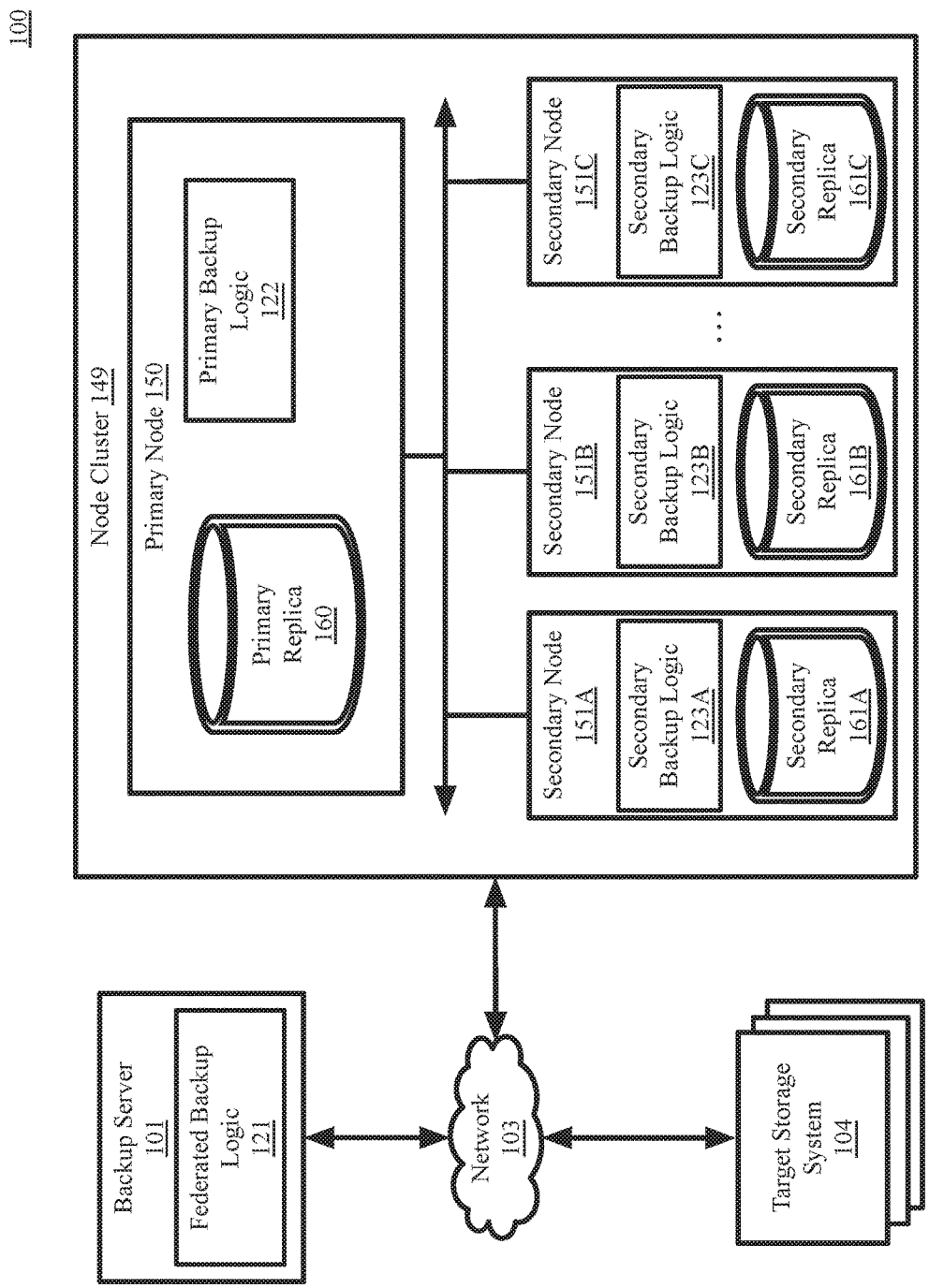
FIG. 1 is a block diagram illustrating a storage system capable of performing a federated backup of data associated with a database node cluster, according to an embodiment.

One issue encountered in a federated backup system is that because each secondary indexes the backups independently, the save times generated by the different secondaries can differ. The different save times can prevent the creation of a consolidated view of a federated backup. For example, when a backup recovery system is used to recover backup data, the user interface (UI) of the recovery utility of the backup system (e.g., recovery UI) cannot show the consolidated view of the entire federated backup because each secondary has its own save time. Accordingly, it may be difficult for an operator of the backup recovery system to determine which specific backup contains the data to be recovered. It would be beneficial if the operation of the backup recovery system were able to select a specific save time to browse (e.g., browse time) and receive an entire view of the federated backup session. One issue preventing the display of a consolidated view is the lack of a direct link among the various secondary backups. Each backup is independently indexed by the secondary that creates the backup. To maintain the granularity of the backup and restore system, the primary cannot be used to create a final index of the secondary backups because if any secondary fails the entire backup can become unrecoverable.

Embodiments described herein solve the problem of browsing federated backups by introducing a link between secondary backups without requiring a primary index. In one embodiment, a "Generation Id" that is unique for each backup session is used by each secondary during a backup session. The Generation Id may be a globally unique identifier (GUID) that is created for each backup session. The primary can pass the Generation Id to all secondary backup operations to use when creating a backup a node within the federated architecture. When the secondary indexes a backup, the secondary saves the Generation Id as an attribute when the secondary saves the indexes for the backup. In some embodiments the Generation Id may also be described as a compound identifier or a backup group identifier, where "group" relates to any and all backup jobs that are related in some manner.

In one embodiment when an operator of the backup recovery system attempts to browse a federated backup, the operator can select a backup time. Federated backup recovery logic can then select a Generation Id that corresponds with a backup that lies within a given time range associated with the selected time. The federated backup recovery logic can then use the Generation Id associated with that backup and acquire a set of secondary backups having the same Generation Id. The UI of the recovery system can then use the set of secondary backups to display a consolidated view of the federated backup. The consolidated view allows the operator to browse all secondary backups (e.g., backups for each node in the federation) associated with a backup session. Additional details will be provided below. While primary and secondary roles are described herein, such terminology is exemplary and different embodiments or different instances of an embodiment may be described with different, although equivalent terminology.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Reference in the specification to "one embodiment," "an embodiment," "alternate embodiment," "another embodiment," and their respective variations means that a particular feature, structure, or characteristic described in connection with the embodiment can be included in at least one embodiment of the invention. The appearances of the phrases "in one embodiment," "in an embodiment," "in alternate embodiment," "in another embodiment," and their respective variations in various places in the specification do not necessarily refer to the same embodiment.

In the following description and claims, the terms "coupled" and "connected," along with their derivatives, may be used. It should be understood that these terms are not intended as synonyms for each other. "Coupled" and its variations are used to indicate that two or more devices or components, which may or may not be in direct physical or electrical contact with each other, co-operate or interact with each other. "Connected" and its variations are used to indicate the establishment of communication between two or more devices or components that are coupled with each other. For example, two devices that are connected to each other are communicatively coupled to each other. "Communication" and its variations include at least one of transmitting or forwarding of information to a device or component or receiving of information by a device or component.

In one embodiment, a backup server can be configured to manage a backup for a multiple of storage systems or storage appliance devices, databases, or application clusters, including virtual variants executing on a virtual machine or virtual machine cluster. Each of a primary node and one or more secondary nodes can be configured to provide storage and retrieval services to data. In one embodiment, federated backups can be performed using a relational database management system (RDBMS) that can utilize multiple proxy nodes that each has a copy of the data to be backed up. In one embodiment, virtual backup proxy nodes can be employed for use in backing up a virtual infrastructure. A backup of a virtual or machine or data set can be off-loaded to a backup proxy node. A backup proxy node can be a virtual proxy node on a proxy server or a physical proxy node, such as a backup proxy server. A backup proxy node can also be a virtual proxy node on a host computer that hosts virtual machines that may be backed up using the virtual proxy node.

Embodiments described herein can be employed to create and browse federated backups for a variety of systems including, but not limited to Microsoft® Exchange, a SharePoint®, SQL Server, and Hyper-V®. However, the concepts described herein are applicable to federated backup systems in general. In general, a federated backup for any system can be created for all nodes in the system and a consolidated view of the backup can browsed via the UI of a management system console for the backup and recovery system.

Any of the methods described herein can be embodied on a non-transitory computer-readable medium programmed with executable instructions that, when executed, perform the method. A system can be programmed with executable instructions that, when executed by a processing system that includes at least one hardware processor, can perform any of the above methods.

Some embodiments include one or more application programming interfaces (APIs) in an environment with calling program code interacting with other program code being called through the one or more interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, and other types of invocations or parameters via the API.

FIG. 1 is a block diagram illustrating a storage system 100 capable of performing a federated backup of data associated with a database node cluster, according to an embodiment. The storage system 100 includes, but is not limited to, a node cluster 149, a backup server 101, and a target storage system 104. Each of the components of the storage system 100 can communicate over a network 103. The node cluster 149 may include multiple nodes 150 and 151A-C. Each one of nodes 150 and 151A-C can be a computing system that includes, but is not limited to, a central processing unit, memory, and a storage device for storing or backing up data (e.g., databases). The node cluster 149 can also include, but is not limited to, any type of server or cluster of servers. For example, node cluster 149 can include a storage server used for any of various different purposes, such as to provide multiple users with access to shared data and/or to back up mission critical data. The node cluster 149 can include, for example, an appliance used to provide NAS capability, an appliance used to provide SAN capability, a unified storage device that combines NAS and SAN capabilities, a nearline storage device, a direct attached storage (DAS) device, a tape backup device, or essentially any other type of data storage device.

In one embodiment, the backup server 101 is responsible for managing backups of multiple storage systems by directing the backing up and restoring of files, folders, databases, and hard drives over a network in order to prevent the loss of data in the event of a hard drive failure, user error, disaster, or accident. In one embodiment, the backup server 101 manages backups by making requests to the node cluster 149. For example, the backup server 101 can receive a backup request from one or more clients (e.g., a personal computers, etc.) of a backup and recovery system of which the backup server is a component. The backup server 101 can process the received requests and issue a backup request to the node cluster 149. In one embodiment the backup server 101 may also be part of a primary storage system (e.g., local data center) that provides storage to one or more clients. The backup server 101 can periodically back up the content stored therein to a backup storage system (e.g., a disaster recovery site or system), such as the target storage system 104. These one or more clients may be any type of client system that includes a server, a host, a personal computer (e.g., desktops, laptops, and tablets), a "thin" client, a personal digital assistant (PDA), a Web enabled appliance, or a mobile phone (e.g., Smartphone), etc. Additionally, there may be more than one client.

The backup server 101 can maintain configuration information of the target storage system 104 and/or node cluster 149, for example, by periodically querying and/or receiving the information from the target storage system 104 and/or node cluster 149. In one embodiment, the backup server includes federated backup logic 121 configured to generate federated backups of the node cluster 149 using a Generation Id associated with each backup session. The federated backup logic 121 on the backup server 101 can direct the backup up of data from secondary node 151A-C via the primary node 150. The backup server 101 can initiate a backup of data stored in node cluster 149 by providing a backup request to the primary node 150 of the node cluster 149. The primary node 150 can then direct, via primary backup logic 122, the backing up of data from via secondary backup logic 123A-C on each secondary node 151A-C In response to receiving the request, the primary node 150 processes the request to determine the data to be backed up. If the primary backup logic 122 is not currently active on the primary node 150, the primary backup logic 122 can be launched and initialized for execution. The primary node 150 can then create a Generation Id for the backup session. The Generation Id is a unique number (e.g., a GUID) associated with the backup session. The primary node 150 can passes the Generation Id to each secondary node 1501A-C, which can each initialize secondary backup logic 123A-C to perform the actual backup process. Each secondary node 151A-C save the "Generation Id" as an attribute when the node saves the index associated with each backup.

To browse a federated backup, a recovery UI associated with the backup and recovery system can query the backups on the target storage system 104 (e.g., via the backup server 101) for the Generation ID associated with a time selected by an operator of the backup and recovery system. In one embodiment the recovery UI logic selects a time within a range of the time provided by the operator. In one embodiment, the operator can provide a range of time to the recovery UI and the recovery UI can select a time within the range. The time associated with time selected by the recovery UI can be designated as a "browse time." The recovery UI logic can then query for the Generation Id of the backup associated with the browse time and use the Generation Id for a second query to select all save times for backups within a time range (e.g., 7 days) of the browse time. The recovery UI logic can then retrieve the save times. In one embodiment the set of save times can be displayed to the operator of the backup and recovery system. In one embodiment the save times can be sorted in descending order and the first sorted save time can be designated as the "actual" browse time. The actual browse time can then be used by the internal logic of the recovery UI to construct a consolidated view of the federated backup. This consolidated view can then be displayed to the operator via the recovery UI.

The illustrated node cluster 149 can represent any type of system upon which a federated backup can be performed. For example, the node cluster 149 can represent a cluster of nodes for use with an RDBMS with redundant database availability groups. The node cluster 149 can also represent a cluster of e-mail servers attached to a redundant e-mail database. In general, the node cluster 149 represents a group of nodes that support a failover environment for a discrete set of user databases that fail over as a group. For example, the primary node 150 and each secondary node 151A-B can act as an availability group for a set of databases, where each database belongs to an availability group comprised of the primary node 150 and secondary nodes 151A-B. The availability group can include a primary replica 160 and multiple secondary replica 161A-C. The primary replica 160 is a primary database that is available for read-write connections from clients (e.g., a backup server). The primary replica 160 can send transaction log records for each primary database to each secondary replica 161A-C. Each secondary replica 161A-C maintains a secondary copy of each availability database and serves as a potential failover target for the availability group. A secondary replica can also support read-only access to secondary databases and/or creation of backups on secondary databases.

While the primary replica 160 is illustrated as being housed on the primary node 150, the primary node 150 is primarily intended to contain the primary backup logic 122 associated with the federated backup logic 121 of the backup server 101. Accordingly, the primary replica 160 can also be housed on a secondary node 161A-C. Additionally, the secondary replicas 161A-C are not necessarily housed on the secondary nodes 151A-C, which primarily contain the secondary backup logic 123A-C. Accordingly, any of the secondary replicas 161A-C can be housed on the primary node 150.

The illustrated network 103 may be any type of network, such as a local area network (LAN), a wide area network (WAN) such as the Internet, a fiber optic network, a storage network, or a combination thereof. Additionally, the network 103 may be a wired network, a wireless network, or any combination thereof. The backup server 101 may be in physical proximity or may be physically remote from client(s), node cluster 149, or target storage system 104. The backup server 101, node cluster 149, and target storage system 104 may be in physical proximity with each other or may be physically remote from each other.

Target storage system 104 may include any type of server or cluster of servers. For example, target storage system 104 may be a storage server used for any of various different purposes, such as to provide multiple users with access to shared data and/or to back up mission critical data. The target storage system 104 can be, for example, a file server (e.g., an appliance used to provide network attached storage (NAS) capability), a block-based storage server (e.g., used to provide storage area network (SAN) capability), a unified storage device (e.g., one which combines NAS and SAN capabilities), a nearline storage device, a direct attached storage (DAS) device, a tape backup device, or essentially any other type of data storage device. The target storage system 104 may have a distributed architecture, or all of its components may be integrated into a single unit. The target storage system 104 may be implemented as part of an archive and/or backup storage system such as a federated storage system available from EMC® Corporation of Hopkinton, Mass.

The breaking up of the dataset that is to be backed up can be performed based on a backup algorithm. In one embodiment, the backup algorithm is based on any criteria used for determining the backing up of data. For example, and in one embodiment, the criteria can include at least one of: (i) a backup schedule specified in a backup policy or a configuration file; (ii) a size of the data to be backed up; or (iii) a number of characteristics of the dataset to be backed up. In one embodiment, once a backup is completed, the secondary backup logic 123A-C on the secondary nodes 151A-C can send a backup completion notification to the primary backup logic 122 on the primary node 150, which in turn sends the backup completion notifications to the federated backup logic 121 on the backup server 101. In an alternate embodiment, the primary backup logic 122 on the primary node 150 sends a single backup completion notification after receiving all the of the backup completion notifications from the secondary nodes 151A-C. In another alternate embodiment, the target storage system 104 sends a single backup completion notification to backup server 101 after the dataset of the availability group is backed up in target storage system 104.

In one embodiment, the data to be backed up can be multiple datasets from multiple availability groups. In one embodiment, each backup of an availability group can be associated with a separate Generation Id. In one embodiment, the primary node 150 performs multiple backups of multiple datasets using multiple nodes selected from the secondary nodes 151A-C. For example and in one embodiment, the primary node 150 can direct a first backup of a first dataset of a first availability group by selecting secondary nodes 151A-B as preference nodes for the first backup. The backup of the first dataset can be associated with a first Generation Id. The primary node 150 can then direct the concurrent generation of a second backup of a second dataset of a second availability group by selecting secondary nodes 151B-C as the preference nodes for this second backup. In this example, when secondary node 151B completes its backup of the portion of the first dataset that was assigned to secondary node 151B, then secondary node 151B can proceed to backup the portion of the second dataset that was assigned to secondary node 151B. The first backup of the first availability group (e.g., some or all of secondary replica 161A-B) can be associated with a first Generation Id. The second backup of the second availability group (e.g. some or all of secondary replica 161B-C) can be associated with a second Generation Id. When browsing the backups in the recovery UI, the backup data associated with the first Generation Id can be displayed in a consolidated manner when browsing the backup. The consolidated view can display backup data from secondary replica 161A that was generated by secondary node 151A as well as the backup data from secondary replica 161B that was generated by secondary node 151B, even through the consolidated view represents separate backups generated by separate nodes having separate save times.

In one embodiment, when there are multiple datasets (i.e., data from two or more availability groups) being backed up, the selected preference nodes from the secondary nodes 151A-C perform all of their backups without regard to the backups being performed by other selected preference nodes of secondary nodes 151A-C. Thus, when secondary node 151A is still in the process of backing up its assigned portion of the first dataset from the first availability group, secondary node 151B is not prevented from moving on to complete the backing up of its assigned portion of the second dataset from the second availability. In other words, the primary node 150 can initiate multiple backups as soon as the selected nodes of the secondary nodes 151A-C are available to perform the backups. This has one advantage of reducing the backup window, given that there is no requirement to wait until all the data from a particular availability group has been completely backed up to proceed with the backing up of data from another availability group. Moreover, by splitting the backing up of data among different preference nodes selected from the secondary nodes 151A-C, the strain on the resources used for backing up the first and second datasets is reduced, which can assist with extending the lifecycle of the storage devices in system 100

In one embodiment, once the backup is completed, each of the selected preference nodes 150A-B sends a backup completion notification to the master node 150, which in turn sends the backup completion notifications to backup server 101. In an alternate embodiment, for each availability group, backup server 101 sends a single backup completion notification to backup server 101 after the data from a set of availability databases of that particular availability group is backed up in target storage system 104. In another alternate embodiment, for each availability group, target storage system 104 sends a single backup completion notification to backup server 101 after the data from a set of availability databases of that particular availability group is backed up in target storage system 104.

Note that some or all of the components as shown and described above (e.g., backup server 101, parallel proxy module/logic 121, and node cluster 149 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 2:
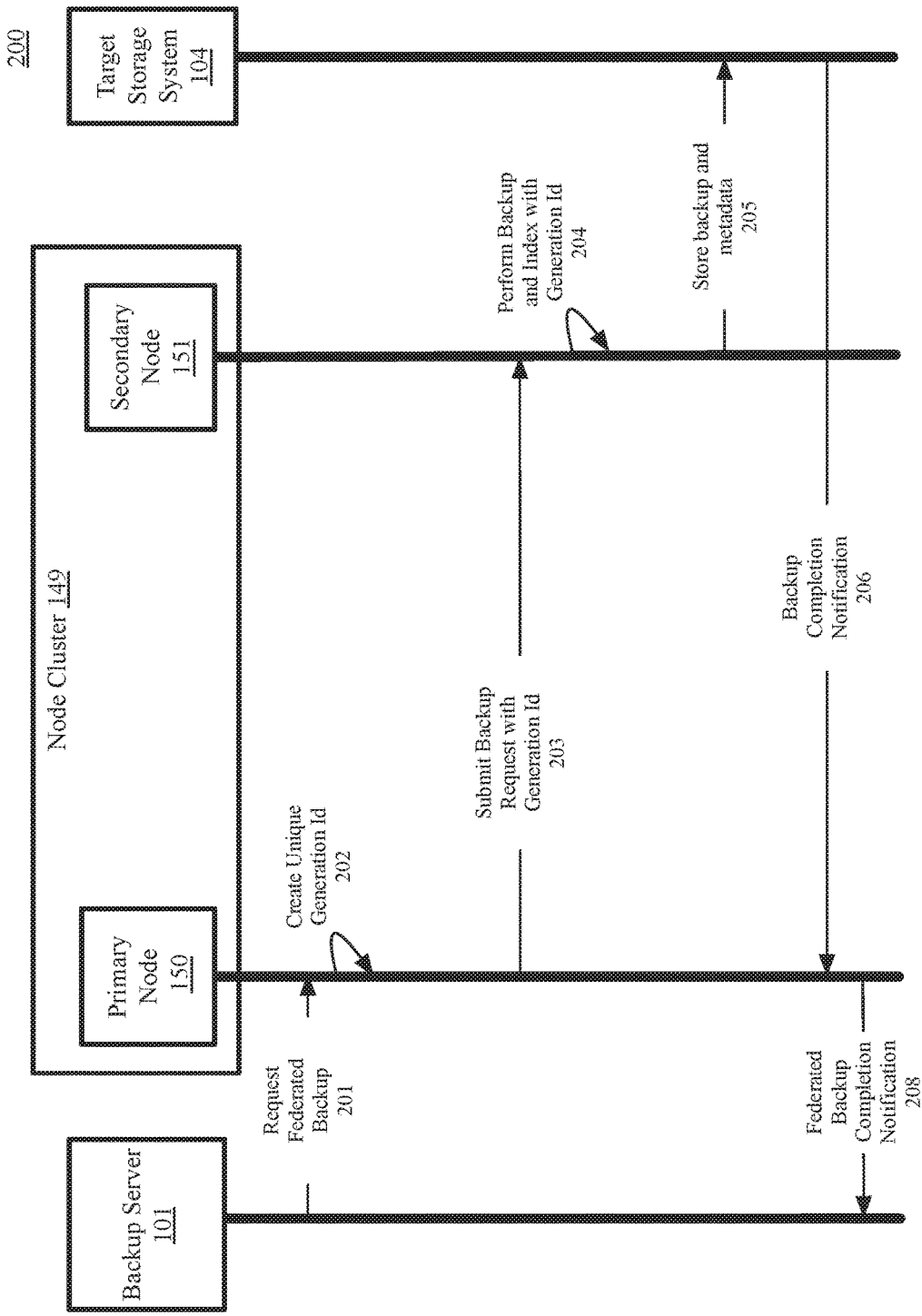
FIG. 2 is transactional diagram illustrating a backup process for creating a browsable federated backup, according to an embodiment.

FIG. 2 is a transactional diagram illustrating a federated backup process 200, according to an embodiment. The federated backup process 200 can be performed by a backup logic such as the federated backup logic 121 on the backup server 101, in conjunction with the primary backup logic 122 on the primary node 150 and secondary backup logic 123A-C on the secondary nodes 151A-C, as shown in FIG. 1. As shown in FIG. 2, the backup server 101 can send a request (201) to perform a federated backup to the primary node 150. The primary node 150 can perform an operation (202) to create a unique Generation Id in response to the request and submit a request (203) to backup a storage resource using the unique Generation Id to a secondary node 151. The secondary node 151 can then perform an operation (204) to backup and index the resource using the Generation Id. In one embodiment the Generation Id is not explicitly passed to each node that performs the backup. Instead, the backup server 101 can implicitly associate the Generation Id with the backup when the backup server 101 receives index information for the secondary node 151, or any other node associated with the backup group.

The secondary node 151 can represent any one of the secondary nodes 151A-C of FIG. 1. Multiple instances of the request (203) can be submitted to multiple instances of the secondary node 151. The multiple instances of the secondary node 151 can perform secondary backup operations in parallel. Each instance of the secondary node 151 can store (205) a completed backup to the target storage system 104. In one embodiment, the backup index and other backup metadata can also be stored. After the backup data is stored to the target storage system 104, the target storage system 104 can provide a backup completion notification (206) to the primary node 150. The primary node 150 can then transmit a federated backup completion notification (208) to the backup server 101, to indicate that the backup of the federated system is complete.

Figure 3:
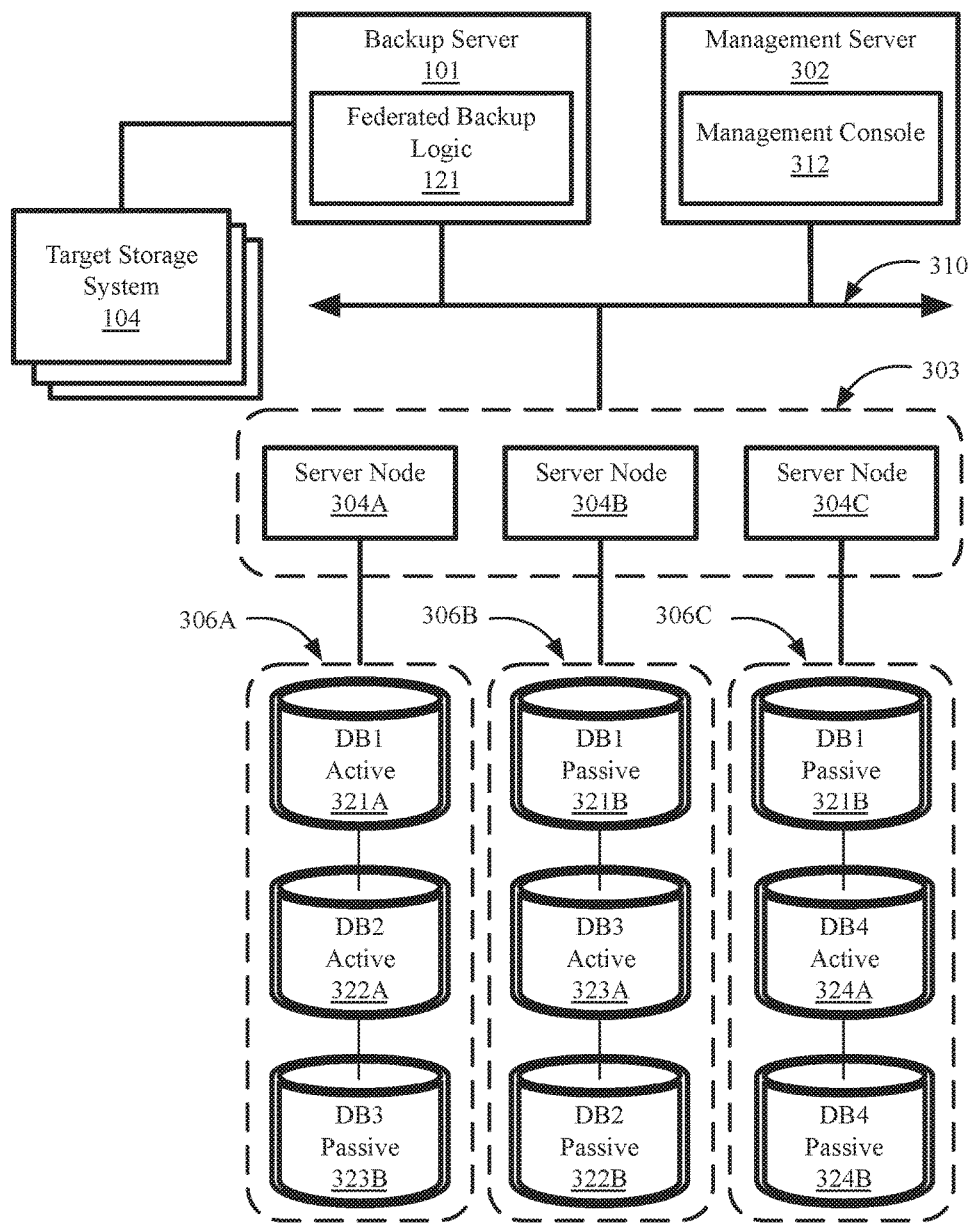
FIG. 3 is a block diagram illustrating a backup system for performing a browsable federated backup of a server node cluster, according to an embodiment.

FIG. 3 is a block diagram illustrating a backup system 300 for performing a browsable federated backup of a server node cluster 303, according to an embodiment. The backup system 300 includes the backup server 101 and a management server 302 coupled to a network 310. In the illustrated embodiment the backup system 300 includes a target storage system 104 that is a direct attach storage device coupled to the backup server 101, although the target storage system 104, in other embodiments can be network attached storage. The backup server 101 includes federated backup logic 121. The management server 302 provides a management console to enable the management of the backup server 101 and the federated backup logic 121. Via the management console 312, the federated backup logic 121 can be triggered to initiate a backup of a set of database cluster nodes 306A-C via the server nodes 304A-C of the server cluster 303. The federated backup logic 121 on the backup server 101 can act as a primary node for the federated backup and direct the server nodes 304A-C of the server cluster 303 to act as secondary nodes.

The database cluster nodes 306A-C include a set databases (DB1-DB4), where each database includes an active replica and one or more passive replicas. Each of the database cluster nodes 306A-C couple to a server node 304A-C in the server cluster 303. In one embodiment, each backup created by the server nodes 304A-C includes a Generation Id that links and associates each backup, such that the management console 312 can provide a consolidated interface for browsing the federated backup. In one embodiment, the management console 212 is configured to display a user interface (UI) that provides a consolidated view of a backup session of the database clusters 306A-C that includes data from each of the separately indexed backups, each of the separately indexed backups has a different save time associated with the backup, as the backups are performed separately by the sever nodes 304A-C.

In one embodiment the federated backup logic 121 requests each server node 304A-C in the server cluster 303 to backup a separate database cluster. For example, server node 304A can backup the database cluster 306A including DB1 active 321A, DB2 active 322A, and DB3 passive 323B. Server node 304B can backup the database cluster 306B including DB1 passive 321B, DB3 active 323A, and DB2 passive 322B. Server node 304C can backup the database cluster 306C including DB1 passive 321B, DB4 active 324A, and DB4 passive 324B. In one embodiment, sever nodes 304A-C synchronize the backup operations, such that server node 304C bypasses the backup of DB1 passive 321B in server cluster 306C if server node 304B has already backed up an instance of DB1 passive 321B from database cluster 306B. During the backup operation each server node 304A-C is responsible for indexing the backups separately, such that each backup is independent of each other backup and can be separately recovered should any other backup fail, or should any specific index become corrupted. Once completed, the separately indexed backups can be presented in a consolidated view by the management console 312.

Figure 4:
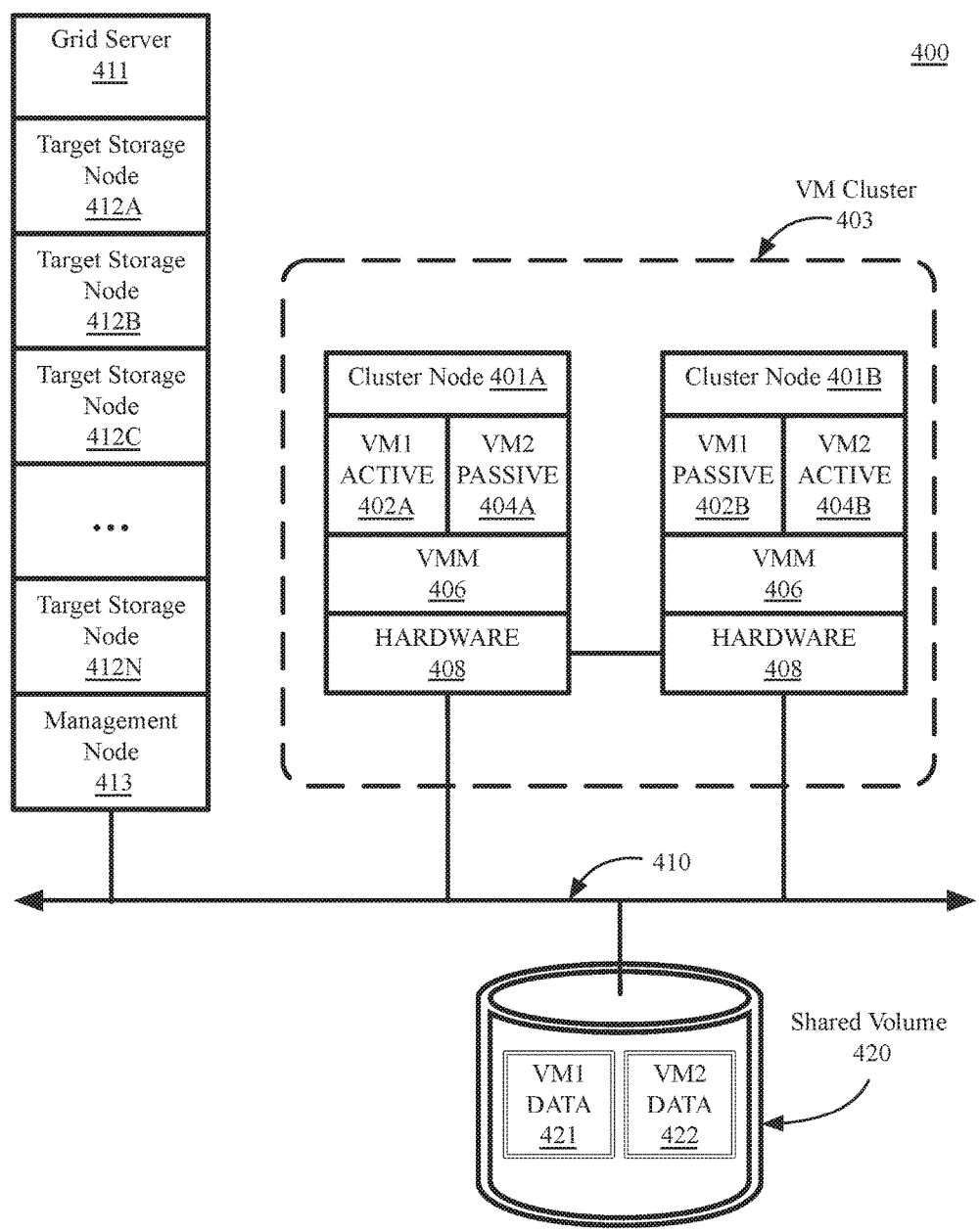
FIG. 4 is a block diagram illustrating a backup system for performing a browsable federated backup of a virtual machine cluster, according to an embodiment.

FIG. 4 is a block diagram illustrating a backup system 400 for performing a browsable federated backup of a virtual machine cluster 403, according to an embodiment. The backup system 400 includes a virtual machine (VM) cluster 403, a grid server 411, and a shared storage volume 420, each coupled to a network 410. VM cluster 403 includes multiple cluster nodes 401A-B including a virtual machine monitor (VMM) 406 (e.g., a hypervisor) and execution hardware 408 to execute instructions provided by multiple virtual machines 402A-B 404A-B. In one embodiment the VM cluster 403 is a failover cluster, in which active VMs (VM1 active 402A, VM2 active 404B) perform operations while passive VMs (VM2 passive 404A, VM1 passive 402B) remain in standby should the cluster node of the active VM experience a failure. The data for each VM (e.g., VM1 data 421, VM2 data 422) is stored on a shared volume 420 that is accessible to each cluster node 401A-B via the network 410.

In one embodiment the grid server 411 includes multiple target storage nodes 412A-N and a management node 413, where each target storage node 412A-N includes a separate data processing system, such that each of the storage nodes 412A-N contributes to the processor, memory, I/O, and storage capacity of the server. The management node 413 manages the set of target storage nodes 412A-N and can also a management console, such as the management console 312 of FIG. 3.

The grid server 411 can connect with to the VM cluster 403 over the network 410 to generate a browsable federated backup of the VM cluster 403 using primary and secondary federated backup techniques similar to those described above with respect to FIGS. 1-2. For example, the management node 413 can provide primary backup logic that can connect to secondary backup logic executing on each active VM (e.g., VM1 active 402A, VM2 active 404B). Alternatively, a set of proxy VMs (not shown) can mount the image data on the shared volume 420 to perform backup operations. The backup images can be distributed across the various target storage nodes 412A-N. Each backup image performed during a backup session can be linked via the use of a common and unique Generation Id that recovery logic can use to enable a consolidated view of the entire federated backup.

Figure 5:
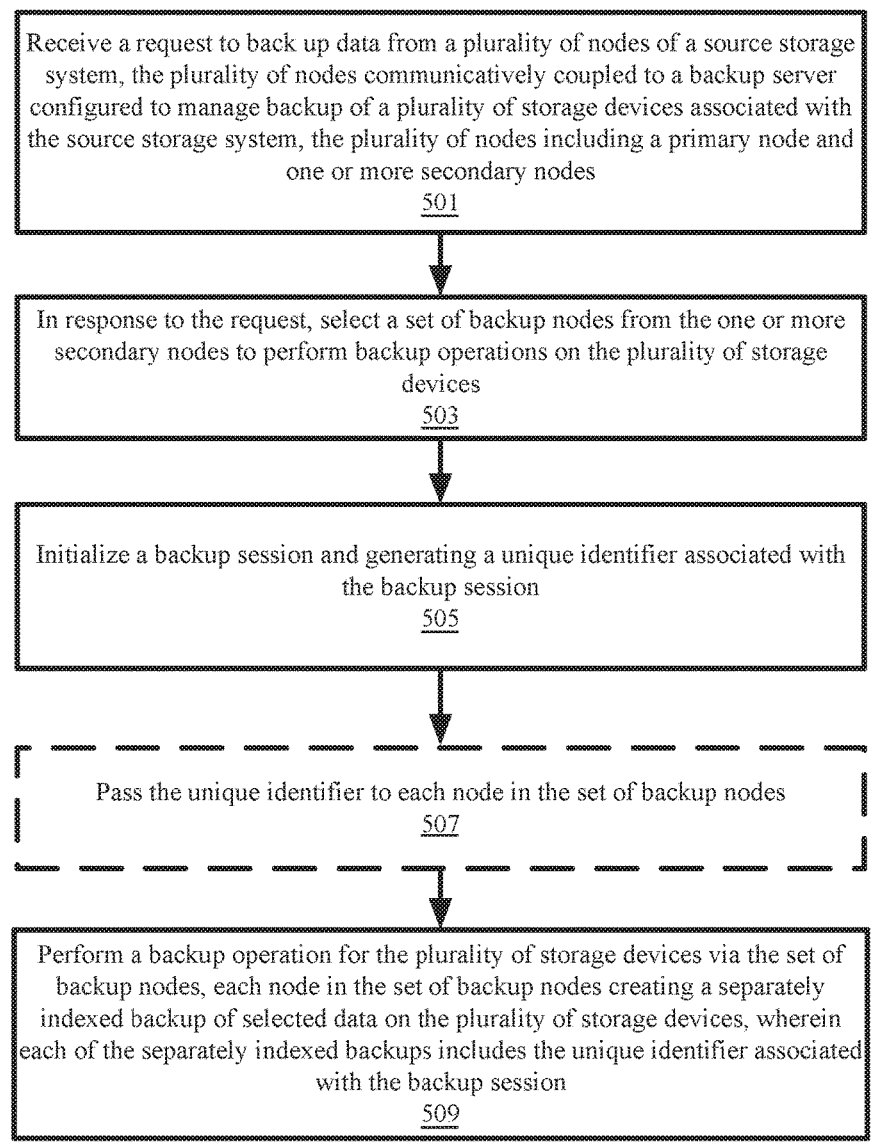
FIG. 5 is flowchart diagram illustrating a process of backing up data, according to one embodiment.

FIG. 5 is flowchart diagram illustrating a process 500 of backing up data, according to one embodiment. The process 500 is performed by a storage system, such as the storage system 100 of FIG. 1, or a backup system, such as the backup system 300 of FIG. 3 or the backup system 400 of FIG. 4. In one embodiment the process 500 is performed by hardware, software, or a combination of hardware and software, as described above in connection with FIG. 1, 3, or 4. For example, portions of the process 500 can be performed by the federated backup logic 121 on the backup server 101 of FIG. 1, in conjunction with the primary backup logic 122 on the primary node 150 and one or more instances of the secondary backup logic 123A-C on the secondary nodes 151A-C.

The backup process 500 begins at block 501, where a request is received to back up data from a plurality of nodes of a source storage system. The pluralities of nodes are communicatively coupled to a backup server that is configured to manage a backup of a plurality of storage devices associated with the source storage system. In one embodiment the plurality of nodes include a primary node and one or more secondary nodes. The process 500 additionally includes selecting a set of backup nodes from the one or more secondary nodes to perform the backup operations on the plurality of storage devices, as shown at block 503. Block 503 of the process 500 can be performed, for example, by primary backup logic on the backup node or can be performed by the federated backup logic on the backup server. At block 505, the process 500 initializes a backup session and generates a unique identifier (e.g., Generation Id) associated with the backup session, which can be performed by primary backup logic on the primary node or can be performed by federated backup logic on the backup server in association with submitting a federated backup request to the primary node. Where the primary node generates the unique identifier, the primary node can submit the unique identifier to each node in the set of backup nodes, as shown at block 507 of the process 500. Alternatively, the primary backup logic can pass the unique identifier to backup logic on the backup server. The backup server can then store the unique identifier to index information received from the backup nodes for any backups associated with the unique identifier. As shown at block 509, the backup nodes can perform a backup operation for the plurality of storage devices associated with the source storage system via the set of backup nodes. Each node in the set of backup nodes can create a separately indexed backup of selected data on the plurality of storage devices. Each of the separately indexed backups includes the unique identifier associated with the backup session, which can be stored within or associated with the index by the backup nodes or by the backup server when the index is received.

Figure 6:
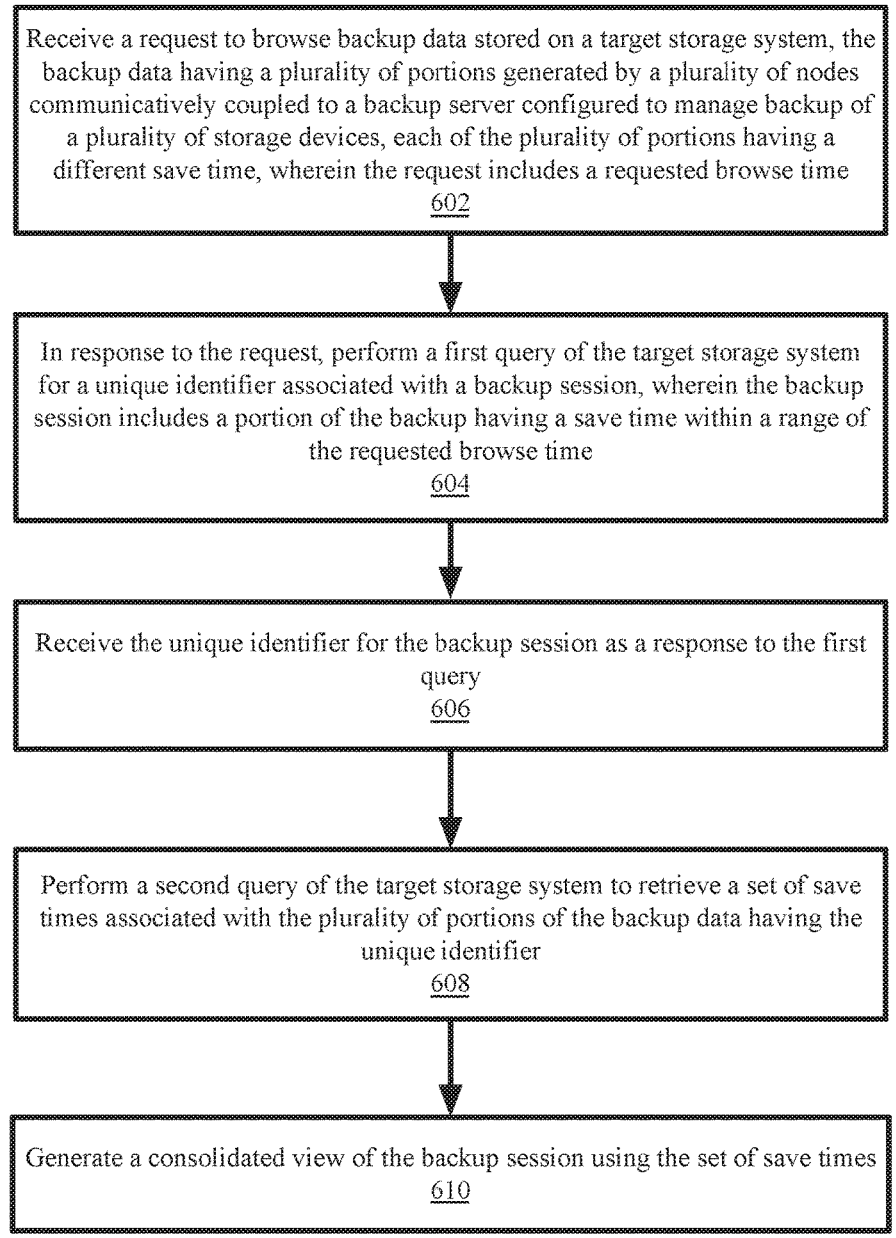
FIG. 6 is flowchart diagram illustrating a process of generating a consolidated view of backup data for a federated system, according to one embodiment.

FIG. 6 is flowchart diagram illustrating a process 600 of generating a consolidated view of backup data for a federated system, according to one embodiment. A management server 302 as in FIG. 3 or a management node 413 as in FIG. 4 can be configured to perform at least a portion of the process 600. In one embodiment the process 600 is performed in part by logic provided by a backup server, such as backup server 101 of FIG. 1. At block 602, the process 600 includes to receive a request to browse backup data stored on a target storage system, such as the target storage system 104 as in FIG. 1-3, or the target storage nodes 412A-N of FIG. 4. The backup data has a plurality of portions generated by a plurality of nodes that, at the time of the backup, were communicatively coupled to a backup server configured to manage the backup of a plurality of storage devices. Each of the plurality of portions have a different save time. In one embodiment the request includes a requested browse time. The request at block 602 can be received via a recovery UI provided via a management console, such as the management console 312 of FIG. 3.

At block 604, in response to the request received at block 602 the process 600 includes to perform a first query of the target storage system for a unique identifier associated with a backup session. The backup session can be identified via the requested browse time, as at least a portion of the backup will have a save time within a range of the requested browse time. The extent of the range can vary between embodiments. However, the save times for each of the portions of the backup will generally be grouped around a similar time period.

At block 606, in response to the first query at block 604, the process includes to receive the unique identifier for the backup session and, at block 608, to perform a second query of the target storage system to retrieve a set of save times associated with the plurality of portions of the backup data. Each of the save times are associated with backups having the unique identifier. At block 610, the process 600 includes to generate a consolidated view of the backup session using the set of save times. The consolidated view can then be presented via a recovery UI that may be provided by any of the backup or management logic described herein.

Figure 7A:
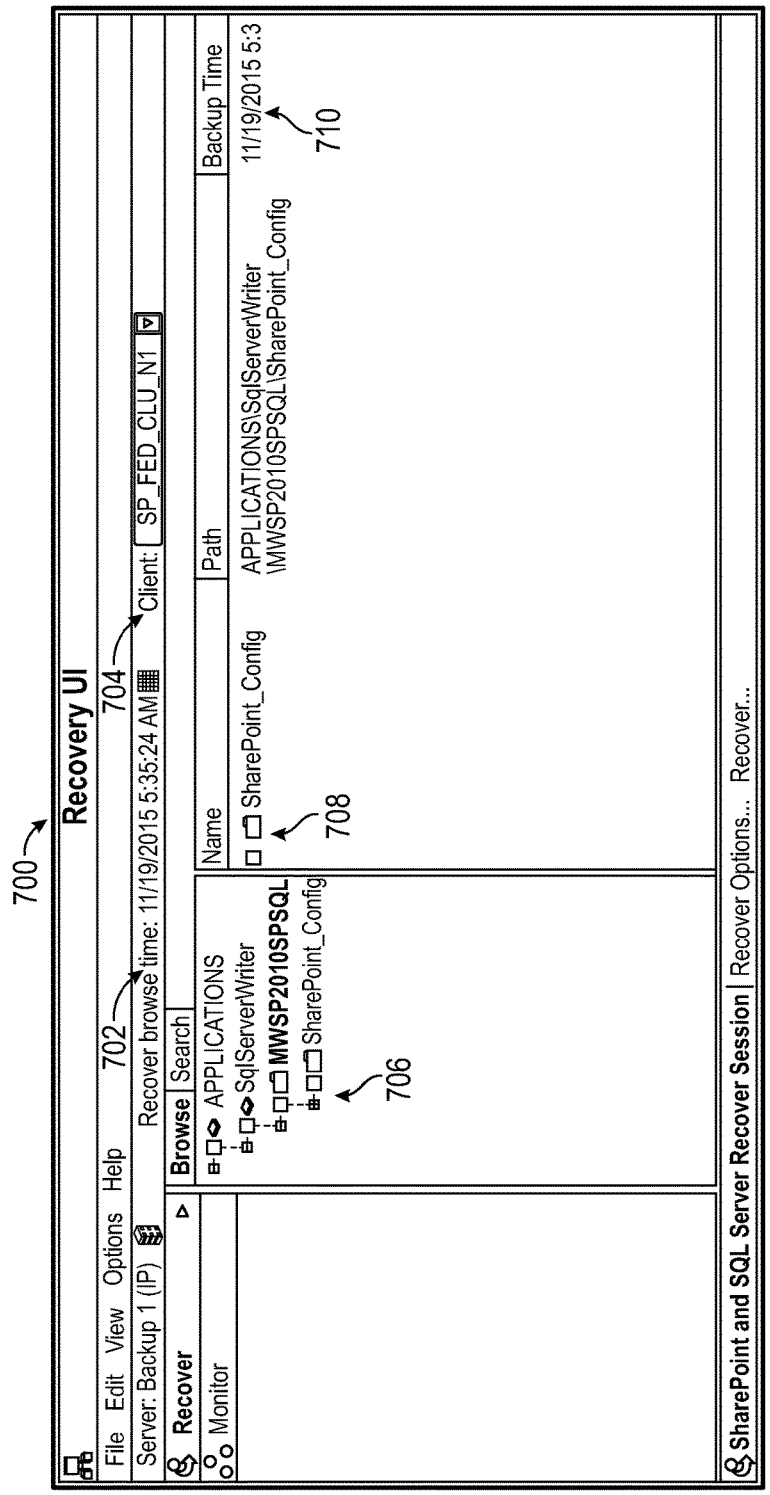
FIGS. 7A-7C are illustrations of a recovery UI for browsing and recovering backups, according to one embodiment.
Figure 7B:
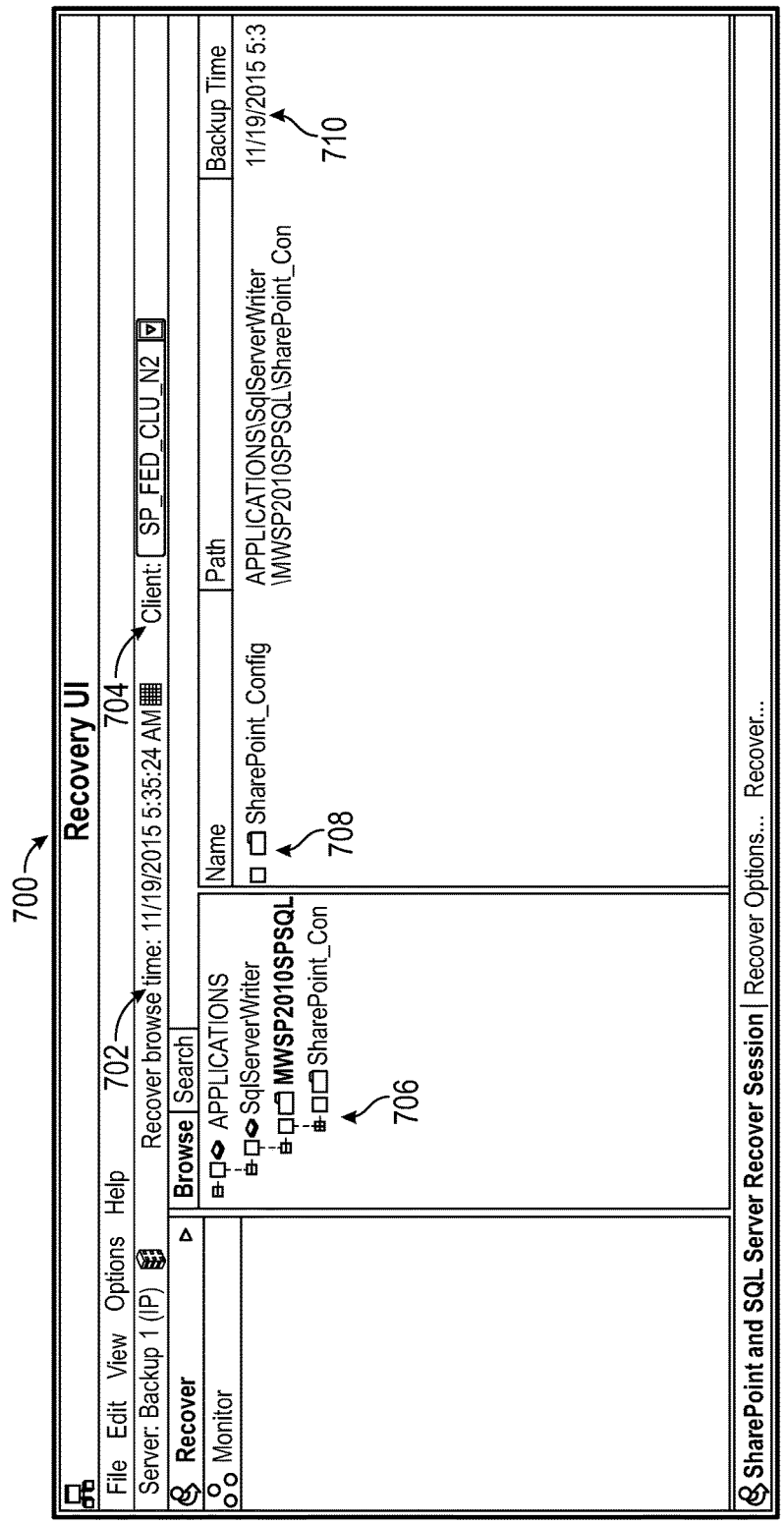
Figure 7C:
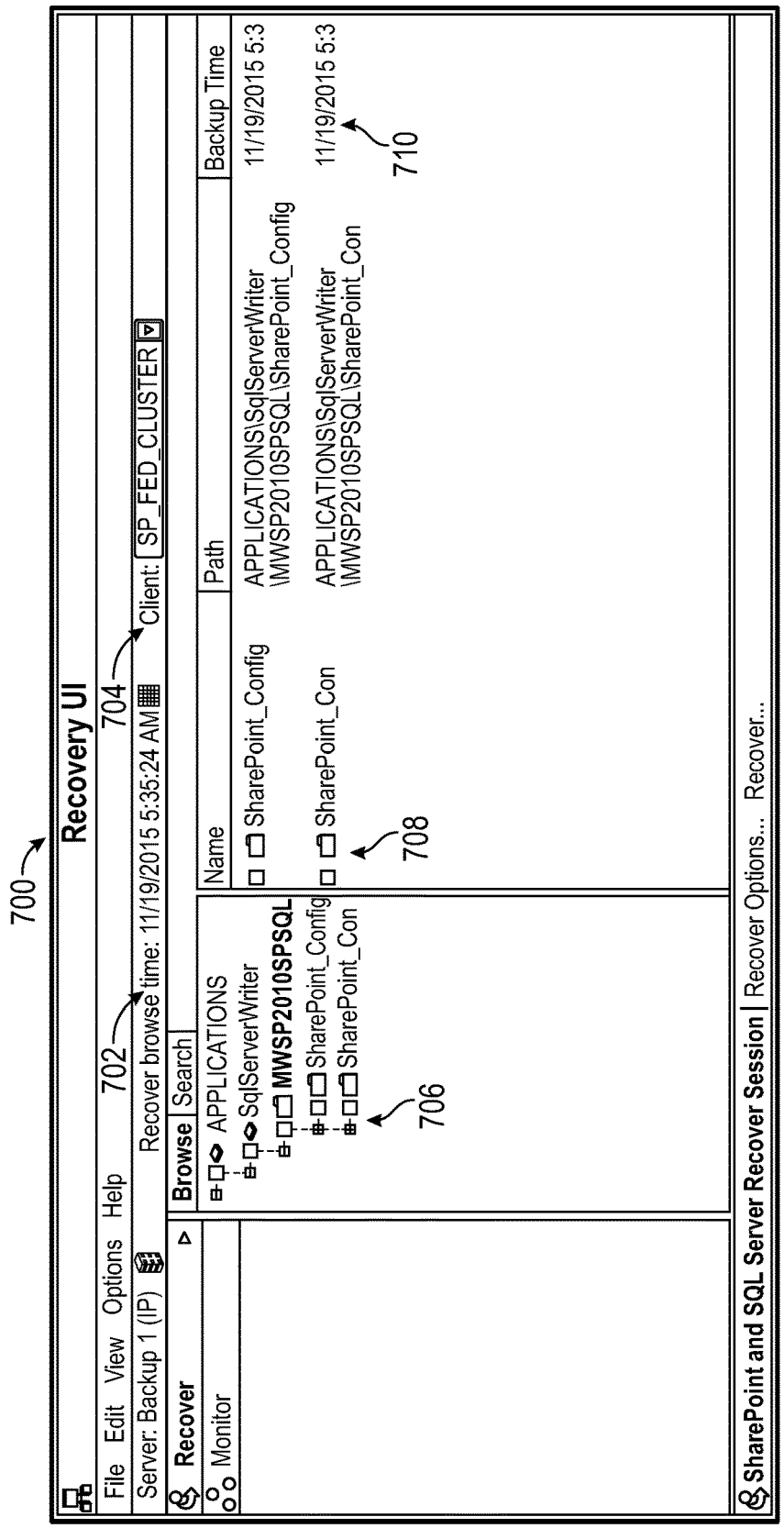

FIGS. 7A-7C are illustrations of a recovery UI for browsing and recovering backups, according to one embodiment. FIG. 7A is an illustration of a recovery UI 702 providing a view of backup information for a first node of a federated cluster. FIG. 7B is an illustration of the recovery UI 702 providing a view of backup information for a second node of a federated cluster. FIG. 7C is an illustration of a recovery UI 702 providing a consolidated view of backup information for the first and second node of the federated cluster.

As shown in FIG. 7A, the recovery UI 700 includes a recover browse time field 704 and a client field 704. As a single node (SP_FED_CLU_N1) is selected, the browse view 706 shows the backup data associated with that node for the requested recover browse time 702. The selected path view 708 shows backup information for an item selected in the browse view 706, including a backup time 710 for the item.

As shown in FIG. 7B, the recovery UI 700 can display backup data for a second node (SP_FED_CLU_N2), as indicated by the client field 704, for the same recover browse time, as shown by the recover browse time field 702. The browse view 706 shows the backup data associated with that node, and the selected path view 708 shows backup information for the item selected in the browse view 706. As shown in the browse view 706 and the selected path view 708, the specific data backed up for the second node differs from the data that is backed up for the first node shown in FIG. 7A. Additionally, the backup information for the second node can have a different backup time 710.

As shown in FIG. 7C, the recovery UI 700 can also display a consolidated view of a federated backup that includes the backup data from the first node and the second node. Using the techniques described herein, a federated backup of both nodes of the clusters can be created. Additionally, as indicated by the client field 704 (SP_FED_CLUSTER), a consolidated view of the federated backup can be displayed that shows backup data from each of the separate nodes of the federated cluster, although the various portions of the backup may have a different backup time 710.

Figure 8:
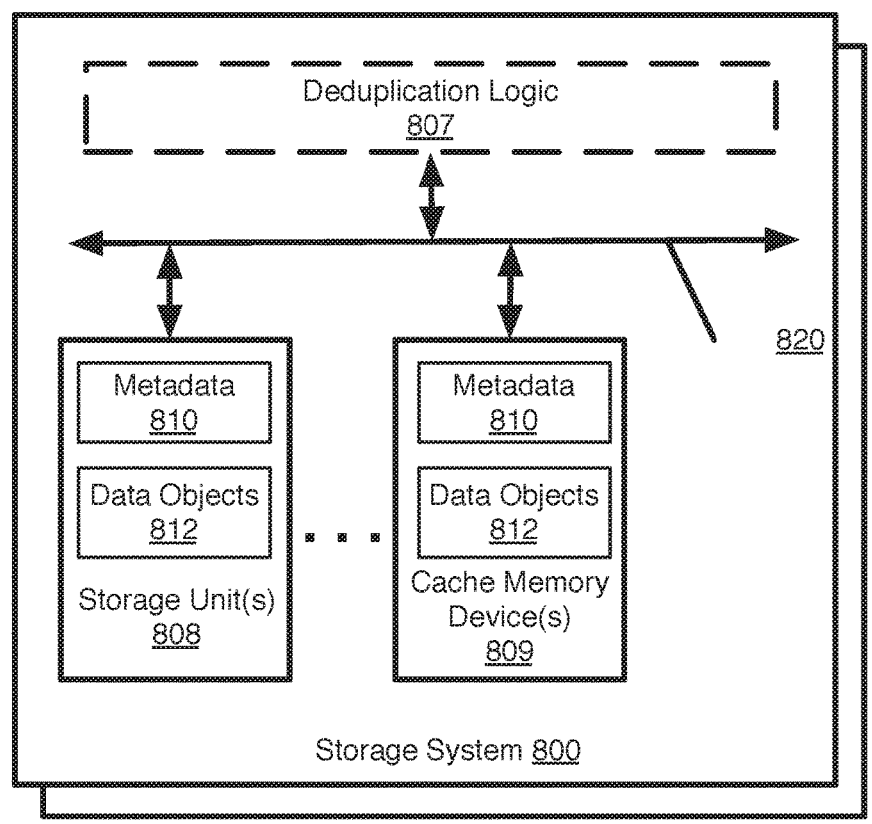
FIG. 8 is a block diagram of a storage system configured as source or target storage system, according to an embodiment.

FIG. 8 is a block diagram of a storage system 800, according to an embodiment. The storage system 800 can be configured as a target storage system, such as the target storage system 104 as in FIGS. 1-3, a storage system of the set of target storage nodes 412A-N as in FIG. 4, or as any source storage system described herein. The storage system 800 may include or represent any type of server or a cluster of one or more servers (e.g., cloud servers). For example, the storage system 800 may be a storage server used for various different purposes, such as to provide multiple users or client systems with access to shared data and/or to back up (or restore) data (e.g., mission critical data). The storage system 800 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. The storage system 800 may further provide storage services via an object-based protocol and Hadoop distributed file system (HDFS) protocol. In one embodiment the storage system 800 includes one or more storage units or devices 808 or one or more cache memory devices 809 (also referred to as cache or cache devices). In one embodiment the storage system 800 additionally includes deduplication logic 807. The deduplication logic 807, storage unit(s) 808, and cache device(s) 809 may be implemented in software, hardware, or a combination thereof.

The deduplication logic 807, storage unit(s) 808, or cache device(s) 809 may be communicatively coupled via an interconnect 820, which may be a bus and/or a network (e.g., a storage network or a network similar to network 103 of FIG. 1). The storage unit(s) 808 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system. The storage units 808 may also be or include optical disks such as CD-ROM or DVD based storage, magnetic tape storage, magneto-optical (MO) storage media, solid state disks, flash memory based devices, or any other type of non-volatile storage devices suitable for storing large volumes of data. Additionally, the storage units 808 may also be combinations of such devices. Data stored in the storage units may be stored in a compressed form (e.g., lossless compression: HUFFMAN coding, LEMPEL-ZIV WELCH coding; delta encoding; a reference to a segment plus a difference; etc.). In one embodiment, different storage units may use different compression methods (e.g., main or active storage unit from other storage units, one storage unit from another storage unit, etc.).

The cache memory device(s) 809 include at least one of a volatile memory device or a non-volatile memory device. For example, and in one embodiment, the cache memory device(s) 809 can be a non-volatile memory device such as a solid state drive (SSD), a flash memory device, a flash-based memory device, a peripheral component interconnect express (PCIe) connected flash memory, solid state device (SSD), magnetic tape, magneto-optical (MO) storage media, or other known non-volatile memory device that is known to be used as a cache memory device.

The storage unit(s) 808 and the cache memory device(s) 809 can store data objects 812 and metadata 810 that describe the data objects 812. The metadata 810 of each storage unit and/or cache memory device includes information to provide access to files of the storage unit or cache memory device. In one embodiment, metadata 810 may include fingerprints or representatives contained within data objects 812, where a data object may represent a data segment (also referred to as a data chunk), a compression region (CR) of one or more data segments, or a container of one or more CRs. Fingerprints are mapped to a particular data object via metadata 810, enabling the system to identify the location of the data object containing a data segment represented by a particular fingerprint. A fingerprint may be generated based on at least a portion of a data segment, for example, by applying a predetermined mathematical algorithm (e.g., hash function) to at least a portion of the content of the data segment. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, deduplication logic 807 is present and configured to process or segment files stored in storage system 800 into multiple data segments (also referred to as data chunks, segmented chunks, or chunks) according to a variety of segmentation policies or rules. Data deduplication is a process by which a data storage system (e.g., storage system 800) can detect multiple identical copies of data and only keep a single copy of that data, thus eliminating the redundant data by removing other copies of that data and thus improving storage utilization. In at least some systems, data deduplication requires iterating over the set of data blocks in one or more storage extents, finding the blocks that contain identical information by processing digest information associated with each block and mapping the identical blocks to a single copy of the data.

In one embodiment, each file is processed by the deduplication logic 807 into multiple data segments. In one embodiment, the deduplication logic 807 breaks a file into variable-length data segments or fixed-length data segments based on a variety of rules or considerations. For example, and in one embodiment, the file is broken into multiple data segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

Figure 9:
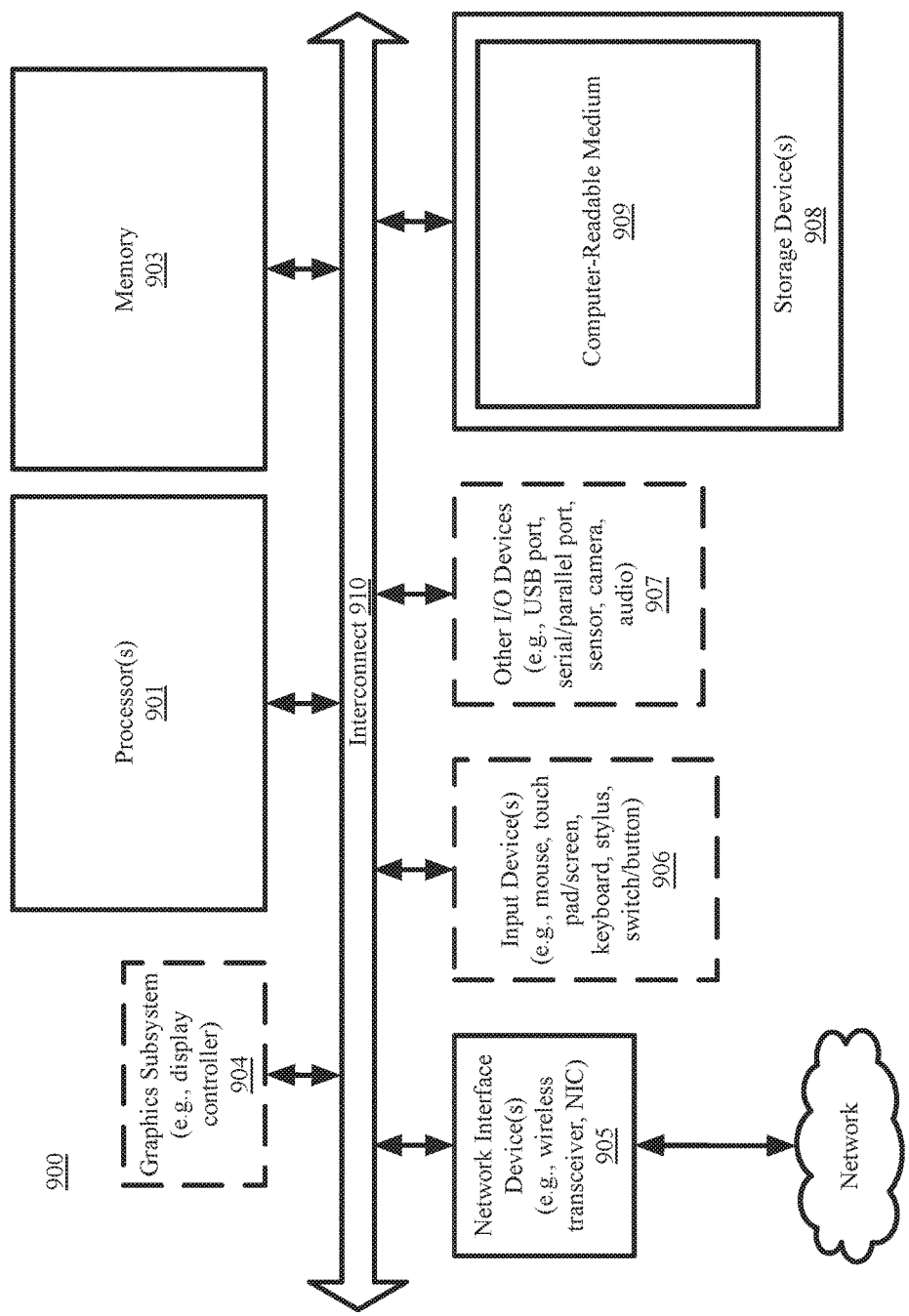
FIG. 9 is a block diagram illustrating a data processing system that can be used to backup data, according to one embodiment.

FIG. 9 is a block diagram illustrating a data processing system 900 that can be used to backup data, according to one embodiment. The data processing system 900 may represent any of the data processing systems described above and may perform any of the processes or methods described above. The data processing system 900 can include many different components. These components can be implemented as integrated circuits (ICs), discrete electronic devices, or other modules adapted to a circuit board such as a motherboard or add-in card of the computer system, or as components otherwise incorporated within a chassis of the computer system. Note also that the data processing system 900 is intended to show a high-level view of many components of the computer system. However, it is to be understood that additional components may be present in certain implementations and furthermore, different arrangement of the components shown may occur in other implementations. The data processing system 900 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment the data processing system 900 includes one or more processor(s) 901, memory 1503, and interface and storage devices 905-908 connected via a bus or an interconnect 910. The one or more processor(s) 901 may be a single processor or multiple processors with a single processor core or multiple processor cores included therein. The processor(s) 901 may represent one or more general-purpose processors such as a microprocessor, a central processing unit (CPU), or the like. More particularly, the processor(s) 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processor(s) 901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor(s) 901 may be a low power multi-core processor, such as an ultra-low voltage processor, and may act as a main processing unit and central hub for communication with the various components of the system. Such processor can be implemented as a system on chip (SoC). The processor(s) 901 are configured to execute instructions for performing the operations and steps discussed herein. The data processing system 900 may further include an optional graphics subsystem 904, which may include a display controller, a graphics processor, and/or a display device. In one embodiment at least a portion of the graphics subsystem 904 is included in the processors(s) 901.

The processor(s) 901 communicates with memory 903, which in one embodiment can be implemented via multiple memory devices to provide for a given amount of system memory. The memory 903 may include one or more volatile storage (or memory) devices such as random access memory (RAM), dynamic RAM (DRAM), synchronous DRAM (SDRAM), static RAM (SRAM), or other types of storage devices. The memory 903 may store information including sequences of instructions that are executed by the one or more processor(s) 901, or any other device. For example, executable code and/or data of a variety of operating systems, device drivers, firmware (e.g., input output basic system or BIOS), and/or applications can be loaded in the memory 903 and executed by one of the processor(s) 901. The operating system can be any kind of operating system such as, for example, Windows® operating system from Microsoft®, Mac OS®/iOS® from Apple, Android® from Google®, Linux®, Unix®, or other real-time or embedded operating systems such as VxWorks.

The data processing system 900 may further include IO devices such as a network interface device(s) 905, optional input device(s) 906, and other optional IO device(s) 907. The network interface device 905 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

The input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, the input device 906 may include a touch screen controller coupled to a touch screen. The touch screen and touch screen controller can, for example, detect contact and movement or a break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

The other I/O devices 907 may also include an audio device. An audio device may include a speaker and/or a microphone to facilitate voice-enabled functions, such as voice recognition, voice replication, digital recording, and/or telephony functions. The other IO devices 907 may also include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The other I/O devices 907 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 910 via a sensor hub (not shown), while other devices such as a keyboard or thermal sensor may be controlled by an embedded controller (not shown), dependent upon the specific configuration or design of data processing system 900.

To provide for persistent storage of information such as data, applications, one or more operating systems and so forth, a mass storage (not shown) may also couple to the processor(s) 901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of flash based storage to act as an SSD cache to enable non-volatile storage of context state and other such information during power down events so that a fast power up can occur on re-initiation of system activities. In addition, a flash device may be coupled to the processor(s) 901, e.g., via a serial peripheral interface (SPI). This flash device may provide for non-volatile storage of system software, including a basic input/output software (BIOS) as well as other firmware of the system.

The storage device(s) 908 may include computer-readable storage medium 909 (also known as a machine-readable storage medium) on which is stored one or more sets of instructions or software embodying any one or more of the methodologies or functions described herein. The computer-readable storage medium 909 may also be used to store the some software functionalities described above persistently. While the computer-readable storage medium 909 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Note that while the data processing system 900 is illustrated with various components of a data processing system, it is not intended to represent any particular architecture or manner of interconnecting the components; as such, details are not germane to embodiments of the present invention. It will also be appreciated that network computers, handheld computers, mobile phones, servers, and/or other data processing systems, which have fewer components or perhaps more components, may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments described herein are not described with reference to any particular programming language. It will be appreciated that a variety of programming languages may be used to implement the teachings of embodiments of the invention as described herein.

In the foregoing specification, the invention has been described with reference to specific embodiments thereof. However, various modifications and changes can be made thereto without departing from the broader spirit and scope of the invention. The specification and drawings are, accordingly, to be regarded in an illustrative rather than a restrictive sense.

What is claimed is:

1. A non-transitory computer readable medium comprising instructions, which when executed by a processing system, cause the processing system to perform backup operations comprising:
receiving a request to back up data from a plurality of nodes of a source storage system, the plurality of nodes communicatively coupled to a backup server configured to manage backup of a plurality of storage devices associated with the source storage system, the plurality of nodes including a primary node and a plurality of secondary nodes, the plurality of storage devices including a first availability group and a second availability group;
in response to the request, selecting a first set of backup nodes from the plurality of secondary nodes to create a first backup of a first dataset on the first availability group on the plurality of storage devices, and selecting a second set of backup nodes from the plurality of secondary nodes to create a second backup of a second dataset on the second availability group on the plurality of storage devices;
initializing a backup session for each of the first backup and the second backup and generating a unique identifier associated with the backup session;
assigning, using a backup algorithm, a portion of the first backup to each node in the first set of backup nodes, and assigning, using the backup algorithm, a portion of the second backup to each node in the second set of backup nodes, wherein the backup algorithm is based on a plurality of criteria including a specified backup schedule and a size of data associated with the backup, wherein each node in the first set of backup nodes and the second set of backup nodes stores the unique identifier associated with their respective backup session in an index of the portion of the backup performed by the each node of the first set backup nodes and the second set of backup nodes; and
performing the first backup and the second backup concurrently, wherein the second backup for the plurality of storage devices is performed via the first set of backup nodes before completing the first backup, wherein each of the first backup and the second backup when completed includes a plurality of separately indexed backups of selected data on the first data set or the second data set on the plurality of storage devices;
displaying a consolidated view of the first backup or the second backup based on the respective unique identifier, the consolidated view representing separate backups generated by the first set of backup nodes or the second set of backup nodes.

2. The non-transitory computer readable medium as in claim 1, additionally comprising:
storing the separately indexed backups of the backup sessions to a target storage system.

3. The non-transitory computer readable medium as in claim 1, wherein the plurality of storage devices includes data associated with one or more virtual machines of a virtual machine cluster.

4. The non-transitory computer readable medium as in claim 1, wherein the plurality of storage devices includes data associated with one or more email servers.

5. The non-transitory computer readable medium as in claim 1, wherein the plurality of storage devices includes data associated with a distributed storage and collaboration system.

6. The non-transitory computer readable medium as in claim 1, further comprising launching primary backup logic on the primary node and, via the primary backup logic, selecting the set of backup nodes, initializing the backup session, generating the unique identifier associated with the backup session, passing the unique identifier to each node in the set of backup nodes, and directing the backup nodes to perform the backup operation.

7. The non-transitory computer readable medium as in claim 1, wherein each portion of the backups is a distinct subset of the first dataset or the second dataset to be backed up, each of first set of backup nodes and the second backup nodes is assigned a unique portion of the first backup or the second backup, and each portion of the backups is associated with a different save time.

8. A data backup and recovery system for performing federated backups, the system comprising:

a source storage system including a plurality of storage devices, the plurality of storage devices coupled to a plurality of nodes including a primary node and a plurality of secondary nodes, the plurality of storage devices including a first availability group and a second availability group;

a backup server configured to manage backing up of the plurality of storage devices associated with the source storage system, the backup server to initiate the backing up of the plurality of storage devices via primary backup logic on the primary node, wherein the primary backup logic initializes a backup session for each of a first backup on the first availability group and a second backup on the second availability group, and direct a first set of backup nodes selected from the plurality of secondary nodes to create the first backup of a first dataset on the first availability group on the plurality of storage devices and direct a second set of backup nodes from the plurality of secondary nodes to create the second backup of a second dataset on the second availability group on the plurality of storage devices to perform backup operations and to generate a unique identifier associated with the backup session;

wherein the backup server uses a backup algorithm to assign a portion of the first backup to each node in the first set of backup nodes, and assign a portion of the second backup to each node in the second set of backup nodes, wherein the backup algorithm is based on one or more of a plurality of criteria including a specified backup schedule and a size of data associated with the backup;

wherein each node in the first set of backup nodes and the second set of backup nodes stores the unique identifier associated with their respective backup session in an index of the portion of the backup performed by the each node of the first set of backup nodes and the second set of backup nodes; and wherein the first backup and the second backup are performed concurrently, wherein the second backup for the plurality of storage devices is performed before the first backup for the plurality of storage devices is completed, wherein each of the first backup and the second backup when completed includes a plurality of separately indexed backups of data on the plurality of storage devices;

displaying a consolidated view of the first backup or the second backup based on the respective unique identifier, the consolidated view representing separate backups generated by the first set of backup nodes or the second set of backup nodes.

9. The backup and recovery system as in claim 8, wherein the backup server is additionally configured to generate the unique identifier for the backup session and associate the unique identifier with the plurality of separately indexed backups.

10. The backup and recovery system as in claim 8, wherein the primary backup logic on the primary node is additionally configured to generate the unique identifier for the backup session and transmit the unique identifier to each node in the first set of backup nodes or the second set of backup nodes, wherein first set of backup nodes or the second set of backup nodes is configured to associate the plurality of separately indexed backups with the unique identifier.

11. The backup and recovery system as in claim 8, additionally comprising a management console to display a user interface (UI) of a backup recovery utility, the UI to provide a consolidated view of the backup session including data from each of the plurality of separately indexed backups, each of the separately indexed backups having a different save time associated with the backup.

12. The backup and recovery system as in claim 11, wherein the management console is to generate the consolidated view of the backup session in response to receiving a request to browse back up data associated with a requested browse time.

13. The method of performing federated backups, the method comprising:

receiving a request to back up data from a plurality of nodes of a source storage system, the plurality of nodes communicatively coupled to a backup server configured to manage backup of a plurality of storage devices associated with the source storage system, the plurality of nodes including a primary node and a plurality of secondary nodes, the plurality of storage devices including a first availability group and a second availability group;

in response to the request, selecting a first set of backup nodes from the plurality of secondary nodes to create a first backup of a first dataset on the first availability group on the plurality of storage devices, and selecting a second set of backup nodes from the plurality of secondary nodes to create a second backup of a second dataset on the second availability group on the plurality of storage devices;

initializing a backup session for each of the first backup and the second backup and generating a unique identifier associated with the backup session;

assigning, using a backup algorithm, a portion of the first backup to each node in the first set of backup nodes, and assigning, using the backup algorithm, a portion of the second backup to each node in the second set of backup nodes, wherein the backup algorithm is based on a plurality of criteria including a specified backup schedule and a size of data associated with the backup, wherein each node in the first set of backup nodes and the second set of backup nodes stores the unique identifier associated with their respective backup session in an index of the portion of the backup performed by the each node of the first set backup nodes and the second set of backup nodes; and performing the first backup and the second backup concurrently, wherein the second backup for the plurality of storage devices is performed via the first set of backup nodes before completing the first backup, wherein each of the first backup and the second backup when completed includes a plurality of separately indexed backups of selected data on the first data set or the second data set on the plurality of storage devices;

displaying a consolidated view of the first backup or the second backup based on the respective unique identifier, the consolidated view representing separate backups generated by the first set of backup nodes or the second set of backup nodes.

14. The method of claim 13, further comprising:
storing the separately indexed backups of the backup sessions to a target storage system.

15. The method of claim 13, wherein the plurality of storage devices includes data associated with one or more virtual machines of a virtual machine cluster.

16. The method of claim 13, wherein the plurality of storage devices includes data associated with one or more email servers.

17. The method of claim 13, wherein the plurality of storage devices includes data associated with a distributed storage and collaboration system.

18. The method of claim 13, further comprising:
- launching primary backup logic on the primary node and, via the primary backup logic, selecting the set of backup nodes;
- initializing the backup session, generating the unique identifier associated with the backup session; and
- passing the unique identifier to each node in the set of backup nodes, and directing the backup nodes to perform the backup operation.

* * * * *